United States Patent [19]

Munz et al.

[11] Patent Number: 4,756,025
[45] Date of Patent: Jul. 5, 1988

[54] METHOD AND DEVICE FOR DATA TRANSMISSION OVER SEVERAL PARALLEL LINES, IN PARTICULAR OPTICAL FIBERS

[75] Inventors: Dieter Munz, Höchstadt; Gerhard Rumold, Bubenreuth; Klaus Schmiedel, Erlangen, all of Fed. Rep. of Germany

[73] Assignee: Siemens Aktiengesellschaft, Munich, Fed. Rep. of Germany

[21] Appl. No.: 916,199

[22] Filed: Oct. 7, 1986

[30] Foreign Application Priority Data

Oct. 29, 1985 [DE] Fed. Rep. of Germany ....... 3538481

[51] Int. Cl.⁴ ............................................. H04B 9/00
[52] U.S. Cl. .................................. 455/608; 455/602; 455/607; 375/111
[58] Field of Search ...................... 455/602, 608, 607; 375/111, 107

[56] References Cited

U.S. PATENT DOCUMENTS

| | | | |
|---|---|---|---|
| 3,461,384 | 8/1969 | Bayati et al. | 455/602 |
| 4,227,260 | 10/1980 | Vojvodich et al. | 455/607 |
| 4,528,695 | 7/1985 | Khoe | 455/612 |
| 4,578,215 | 2/1986 | Oates et al. | 455/607 |
| 4,580,872 | 4/1986 | Bhatt et al. | 455/612 |
| 4,611,336 | 9/1986 | Fryer | 375/111 |

Primary Examiner—Robert L. Griffin
Assistant Examiner—Leslie Van Beek
Attorney, Agent, or Firm—Kenyon & Kenyon

[57] ABSTRACT

A method and device for data transmission over several parallel lines, in particular over optical fibers is described for transmitting measured values from a measuring station arranged at a high-voltage line to an evaluating electronic system at a high data rate, a high utilization of the available transmission lines, preferably optical fibers, is desirable. To this end, via a clock line, clock messages are relayed which are separated from each other by a synchronization interval (P2) and which begin at least with a fixed clock message portion (PT), which may preferably be followed by a freely usable clock message portion. The receiver recognizes each message start by the synchronization interval of the clock messages and forms during the fixed clock message portion synchronous sampling pulses, which may be followed by asynchronous sampling pulses for the duration of the free clock message portion. The transmitter can now send via data lines data messages which begin synchronously with the fixed clock message portions and need not contain any fixed programmed pulses for the recognition of telegram messages.

12 Claims, 8 Drawing Sheets

METHOD AND DEVICE FOR DATA TRANSMISSION OVER SEVERAL PARALLEL LINES, IN PARTICULAR OPTICAL FIBERS

BACKGROUND OF THE INVENTION

The invention relates to a method for data transmission from a transmitting station—in particular a remote transmitting station—to a receiving station for processing the data, over several parallel lines, preferably optical fibers. The invention further relates to a device suitable therefor.

To be able to transmit several measured values or data words (bytes) within a certain transmission cycle, it is customary to assign to each measured value a transmission line of its own and to arrange the separate data bits of each byte in the form of a data message and to transmit them as a sequence of data pulses in such a way that a specific bit of the byte has assigned to it a specific data pulse position in the data message. To separate data messages successively transmitted on the same data line (which therefore extend in each instance over a number, corresponding to the number of bits), of data pulse positions, it has been customary until now to assign certain preset data pulse positions at the data telegram end and after a synchronization interval of a given minimum length, according to a recognition code.

The receiver samples the pulse positions at its data line terminal at a sampling rate corresponding to the pulse frequency and correlates the pulses picked up at these positions to the respective bits of the data word.

As a rule, the transmitter contains a high-frequency operating clock which controls the transmission clock for the pulse configuration of the data messages, while in the receiver an independent high-frequency operating clock controls the sampling of the data pulse positions. If there is no separate clock line for synchronization of the receiver sampling clock with the transmitter transmission clock, a synchronization interval is not only necessary for the separation of the data messages, but it is also utilized for compensating for phase shifts between the transmitter transmission clock and the sampling rate. Yet in such an asynchronous transmission method the number of usable data pulse positions within each data message is limited because of this asynchronism, and in addition a part of the available data pulse positions is occupied by the recognition code for message start and end.

According to U.S. Pat. No. 4,220,822, pulse trains of 64 clock pulses each are made available on a clock line for a time multiplexing method in an input/output device of a data processing system by a central pulse generator connected to the operating clock of the system. Data messages of 8 bits each are sensed successively, by eight transmitters connected to a common data line into eight receivers. To this end, in each transmitter the clock pulses are counted as a new pulse sequence begins. The transmitters with their associated receivers are successively activated only for the duration of a partial sequence of 8 clock pulses. Each partial sequence serves to synchronize the transmitter and receiver, while each whole pulse sequence controls the time-multiplex activation of the transmitter/receiver pairs. By appropriate programming, the length and the number of the data messages can be adapted to the practical case. But since the error rate increases with the length of the pulse sequences, such a time-multiplex method is trouble-prone, for example—at least at a higher repetition frequency of the clock pulses—for eight data telegrams of 15 bits each. Disturbances occur in particular during feeding in of bytes into a computer when these bytes are provided by a remote transmitting station over relatively long transmission lines at a higher transmission frequency, worth the receiving station arranged at the data inputs of the computer and containing a high-frequency clock pulse generator.

SUMMARY OF THE INVENTION

Therefore, it is impossible to transmit data with 15 bits to be transmitted at satisfactory separation between pulse trains or messages with a pulse repetition frequency of 1 MHz, by using an asynchronous method. Instead, there must be available a clock line with clock pulses synchronously correlated with the data pulse positions. Each clock pulse has assigned to it a data pulse position in rhe data message, so that for the transmission of a data message, the transmitter must occupy 15 data pulse positions in the data message with respective bits. To these data pulse positions there correspond on the clock line an equal number of clock pulse periods, that is, a clock pulse train of a duration of 15 microsecond. The receiver samples the data pulse position within the data messages received at its data line terminal in synchronism with the clock pulses. For recognition of the message end a recognition code with a signal interval of a given minimum length must further be transmitted and sampled, whereby the transmission cycle required tor one byte is lengthened. That is, for the transmission of the data message including code and interval a time is required which in the practical case of 15 data bits per byte exceeds a desirable transmission cycle of 10 microseconds byte.

Optical fibers are especially suitable for the transmission of high frequency pulses. However aging of the luminescent diodes used for feeding the light pulses, and of the photosensitive components extracting the pulses, as well as absorption, dispersion and other interferences in the optical fibers may necessitate continuous monitoring of the optical transmission system itself.

While giving up a time-multiplex method, the invention proceeds from a synchronous method in which the transmitter transmits via a clock line the clock pulses associated with the data pulse positions and the receiver samples the data pulse position within the data messages received at its data line terminal in synchronism with the clock pulses applied at its clock line terminal.

It is the object of the invention to develop this synchronous transmission method in such a way that as many data as possible can be transmitted in a given transmission cycle.

In particular, the data are to be relayed from a measuring station over relatively long distances to a system which processes these data. Preferably the data transmission is to take place via optical fibers, in order to transmit measured values from a measurement station on high voltage (e.g. transducers at the top of a high voltage tower) to an electrically separated and grounded evaluation electronic system (e.g. arranged at the foot of the high voltage tower) by optical means.

For the solution of this problem the invention provides that the transmitter send, via the clock line clock messages separated by intervals, and via the data line, data messages, and that the receiver recognizes the beginning of the data messages from the interval between the clock messages. The receiver then samples the content of the data message synchronously with the clock pulses. The synchronization interval, therefore, is arranged, not between data messages, but between clock messages. Each clock message begins with an identical sequence of clock pulses and clock intervals, so that a recognition code for the beginning and end of the message is not necessary. The number of data pulse positions usable for data pulses on the data line is thereby increased.

As long as each data pulse position is assigned in a fixed manner to one clock pulse or respectively to one clock pulse interval and is transmitted synchronously, the length of the data message must be equal to the clock message length. This, however, is not necessary, but rather, after a clock message end, additional data pulse positions may be provided in the data message, which can then be sensed asynchronously by the receiver. The number of available data pulse positions of the data line is thereby increased, while at the same time the necessary synchronization interval remains recognizable via the clock line. In this variant, therefore, only the first data messages portion is sent synchronously with the clock pulses. However, the number of remaining pulse positions of the data message, sampled asynchronously, is very limited.

Such a switch-over from synchronous to asynchronous control of the sampling can be used for the transmission of additional data on the clock line. In consideration of the minimum length of the synchronization interval and the clock pulses of constant length and amplitude required for reliable recognition of the message start there remain in the transmission cycle other pulse positions in the clock message which in accordance with the invention are freely usable for supplementary pulses. In the receiver it then suffices to turn off the synchronous sampling of the data messages after the number of clock pulses required for recognition of the message beginning (in the synchronous message portion) and to switch over to time-controlled, asynchronous sampling, the remaining free clock message portion (and possible the remaining date message portion) being then sampled asynchronously.

In the case of greater distances between transmitting station and receiving station, as has been found experimentally propagation time effects may already disturb the synchronous sending and the sampling within the fixed clock message portion. To avoid this, the clock line and the data lines are installed approximately parallel to each other, and, independently of the operational frequency of a system which processes the data on the receiver side, the messages are controlled on the clock line and the data lines by a separate clock generator of the transmitting station.

DETAILED DESCRIPTION OF THE INVENTION

Figure 1:
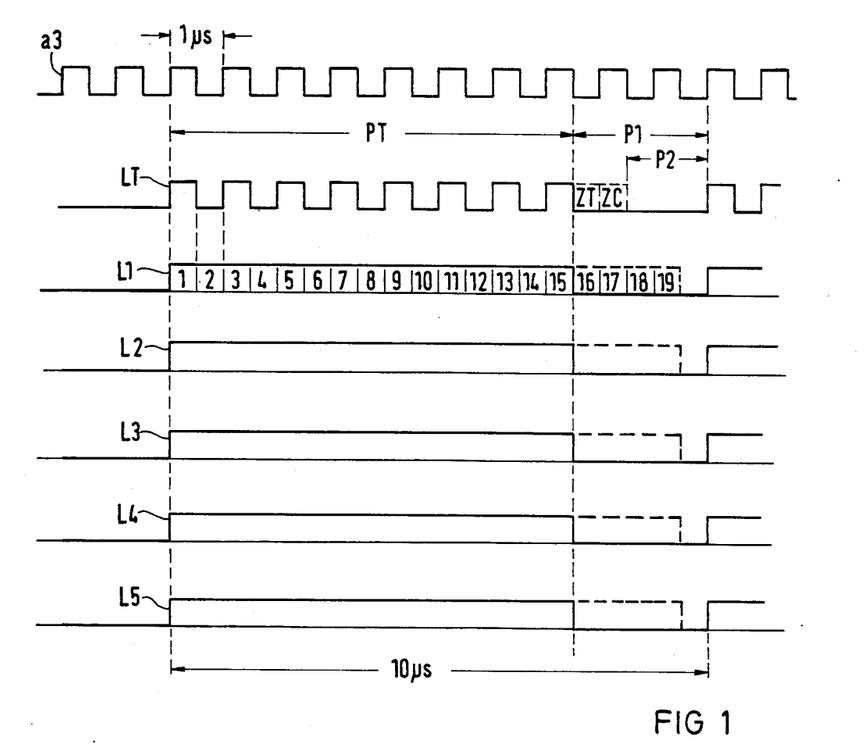
FIG. 1 shows the general setup of the messages for parallel transmission of five data words.

In FIG. 1, a3 represents a pulse train which corresponds to a selected transmission frequency of 1 MHz. The clock pulses of a transmission clock generator 200 (FIG. 2) control a clock pulse coupler 200a provided to generate a transmission cycle of 10 microseconds and for the synchronous transmission of 15 data bits. The coupler in each instance, couples eight clock control pulses (if desired with a slight but constant time delay) into a clock line LT and then remains idle for an interval of 2.5 microseconds. In the following, lines and the signals transmitted over these lines are given the same reference symbols. The "clock messages" transmitted over line LT begin, therefore, with the fixed clock message part PT, comprising a sequence of alternating constant clock pulses at the transmission frequency synchronous with a3, having an interval of predetermined length P1. The clock pulses ZT and ZC are ignored for the present.

Figure 2:
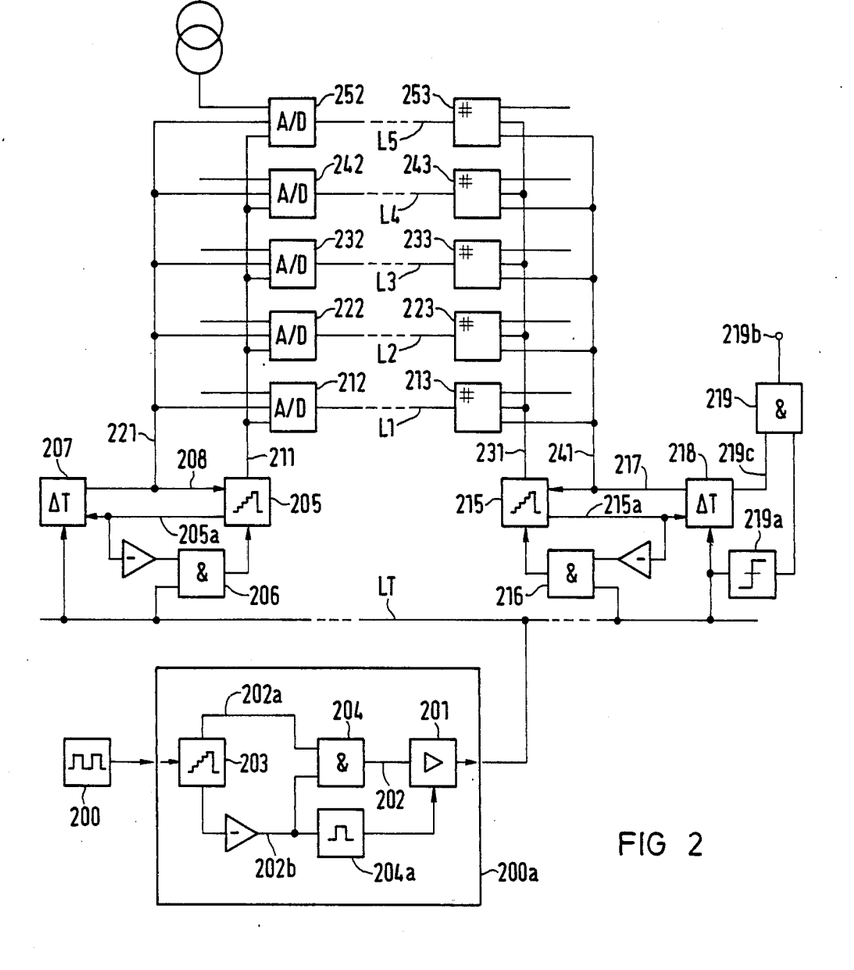
FIGS. 2 and 3 show two schematic designs of the transmitters and receivers required therefor.

The clock pulse coupler 200a contains a counter, resettable after 10 clock pulses, for the clock control pulses a3, which controls via the lines 202, 202a, an amplifier 201 for driving line LT, as long as a gate 204 is not disabled through an overflow signal 202b. This overflow signal is generated after the eighth clock control pulse.

The bits to be transmitted are furnished by data sources, which may be designed for example as analog-to-digital converters 212, 222, 232, 242, 252 disposed at the output of measuring elements. The data bits from the converters are successively fed by a serial data output terminal into the data lines L1, L2, L3, L4, L5 in response to enable signals (line 211). If all bytes consist only of "1" (or "mark") pulses, there result the data messages L1 to L5 of FIG. 5 with the data positions 1 to 15, being occupied and the data on positions 16 to 19 being presently ignored.

The readout of the A/D converters 212, . . . , 252, i.e. the time sequence of the data message and data position, is synchronized to the pulses of the clock message on line LT and hence to the clock control pulses a3 by means of a pulse control. The driving pulses thereof can be taken off directly at the transmission clock generator 200 or at the clock pulse coupler. If, for example, generator 200 of FIG. 2 is disposed at a location not adjacent the data sources 212, . . . , 252, the pulse control may be actuated also by other means with driving pulses which are formed synchronously with the pulses of the clock message. In FIG. 2, there serves as pulse control a counter 205 for the pulse edges of the clock pulses, which counter furnishes by its output on line 211 an enable signal for readout of the next bit from the A/D converters and is resettable via a reset line 208, to enable the readout of a new byte. An overflow line 205a and a gate 206 serve—in accordance with the elements 202b and 204—to lock the pulse control during the interval P1, while a timing stage 207 cancels the locking again after the interval P1.

On the receiving side, a sampling means, which samples the data messages and is triggered by the clock pulses received at the clock line, as well as a means for recognition of a message interval are provided. What is essential here is that the means for recognition of the message interval is connected to the clock line.

This interval recognition means is symbolized in FIG. 2 as a time control 218 connected to a sampling control. In accordance with the pulse control 205, 205a, 206, 208 on the transmitter side, the sampling control is represented as a counter 215 with an overflow and a gate 216 at the counter input which is connected to the clock line and blocks the counter clock triggered by the pulse edges of the clock pulses and queued up also at line 231, as soon as an overflow results at line 215a after the number of clock pulses provided for the fixed clock message portion. The time control 218 itself monitors the pulses on the clock line LT and generates a reset signal for the counter when a pulse interval exceeding a given minimum synchronization interval P2 occurs. Thereby there is enabled on line 241 the counter clock triggered by the clock pulses, which enables the data input of shift registers 213, 223, 233, 243, 253 for the serial read-in of the data messages. At the end of the fixed clock message portion, therefore, the shift registers contain the synchronously sampled data bits of the relayed bytes.

Since, as can be seen from FIG. 1, for recognition of the clock message start only a fixed clock message portion PT with a given number of pulse positions is required, and for recognition of the synchronization interval only the pulse interval P2, freely usable pulse positions remain in the clock message via which supplementary information (e.g. a supplementary pulse ZT for the testing of the line LT and a control pulse ZC for monitoring the supply voltage of the clock pulse generator 200a) can be relayed.

For the coupling in of these supplementary pulses it is provided, according to FIG. 2, that at the end of the fixed clock message portion, the time element 204a drives the amplifier 201 with pulses which trigger e.g. a clock pulse of reduced pulse height or amplitude. The latter is then, depending on the response of a clock pulse detector (limit indicator 219a), either signaled on the receiver side or suppressed, to permit monitoring of the transmission system.

Depending on the usage of the free supplementary pulse portion, therefore, the clock message interval may fluctuate between the minimum synchronization interval P2, which is not used by clock pulse coupler 200a and monitored by the interval recognition means 218, and the signal interval P1 between the fixed clock message portions PT. In the receiver, the sampling pulses triggered with the received clock pulses are blocked on line 241 at the end of the fixed clock message portion. For sampling the free clock message portion, the interval recognition means then generates by appropriate time steps time-controlled sampling pulses which via line 219c actuate a gate 219 which switches the signals of detector 219a through to a fault indication 219b.

Thereby a receiver at the end of the fixed clock message portion needed for synchronous sampling of the data messages is switched to asynchronous sampling of the remaining free clock message portions.

For recognition of the message start, it is only necessary that the clock message begin with a reliably recognizable fixed clock message portion. Therefore, free clock message portions may be provided also within the clock message. In addition, during the free clock message portion (and even during the clock message intervals) data pulses can be transmitted and sampled asynchronously, as is indicated by the pulse positions 16 to 19 of FIG. 1.

A special area of application of the invention includes cases where a high transmission frequency or insulation problems necessitate data transmission via optical fibers and over relatively long distances.

Figure 3:
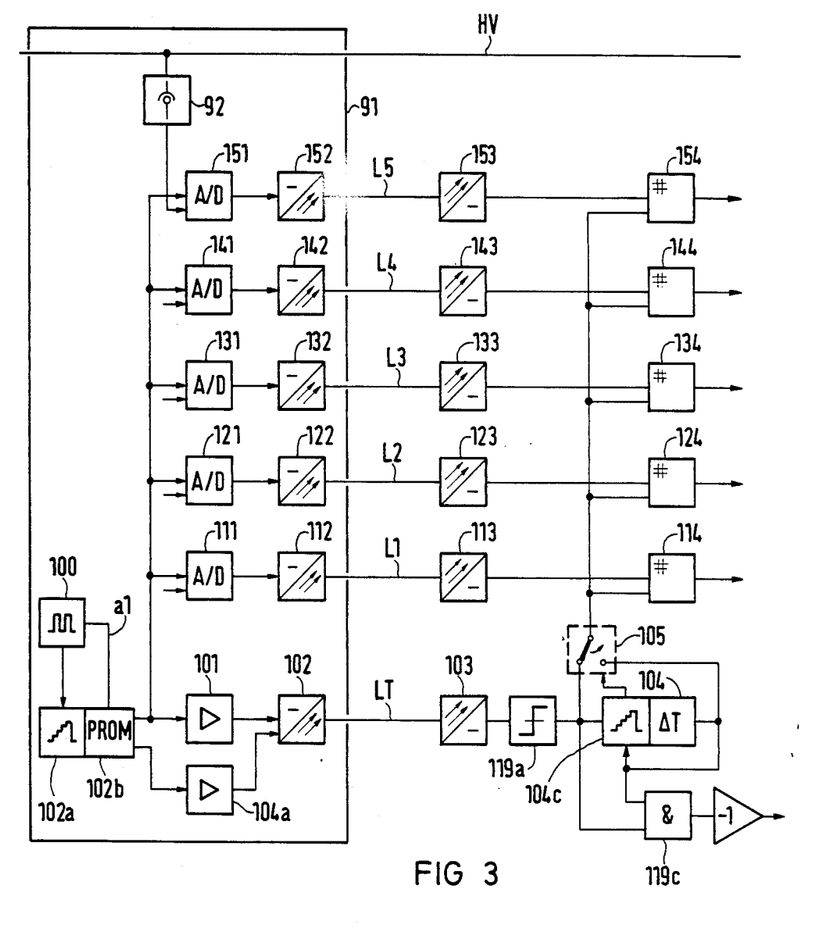
Figure 4:
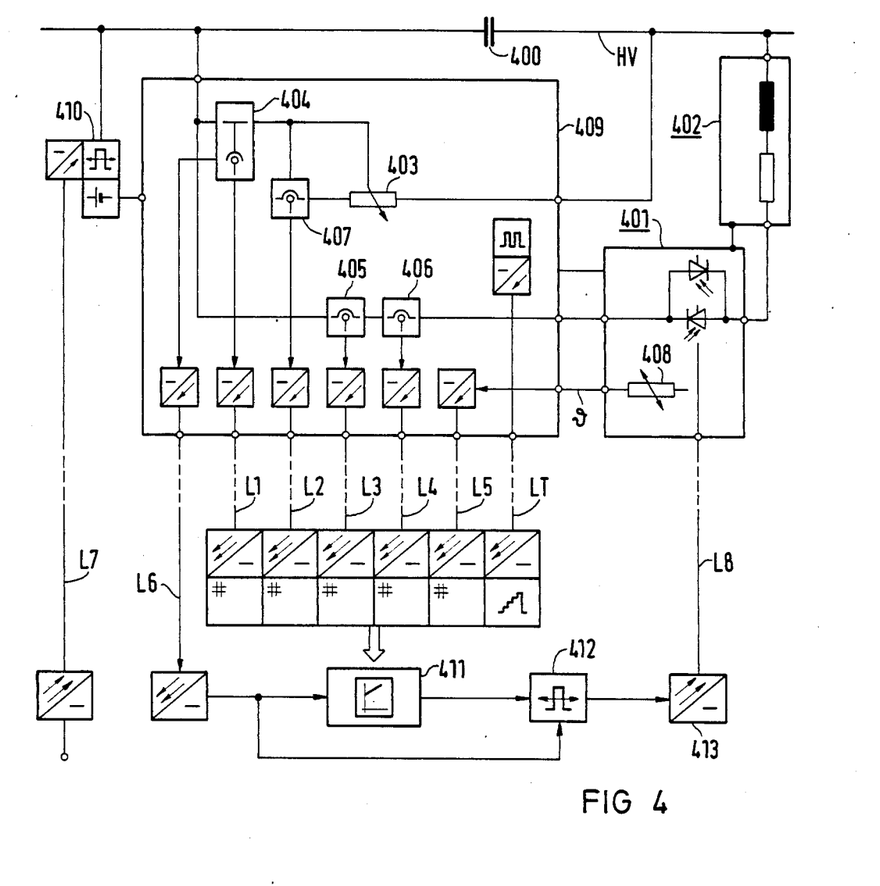
FIGS. 4 and 5, show an advantageous application of the invention and the relayed messages.

In FIG. 3 it is assumed that for the control of certain processes at a high voltage network HV, measurement values must be picked off and processed in an electronic system (not shown). As the electronic control should be accessible and be at ground potential, it is provided to transmit the required measurement data via optical fibers LT, L1, . . . , L5 from the measurement station, which in this case always operates as a transmitter.

A voltage transformer 92 is connected to an analog/digital converter 151 forming a measuring element with a serial data output which is coupled to a connected controllable light source 152 on the data line L5. For the further lines L1 to L4, corresponding converters 111, 121, 131, 141 and light sources 112, 122, 132, 142 from the respective data sources, are connected to additional transducers (not shown). Connected to the waveguide LT is an additional light source 102, which is fed by a driver 101 and corresponds to the amplifier 201 in the clock pulse coupler 200a of FIG. 2. The transmission clock is supplied by a generator 100, and as pulse control essentially a programmed memory times by the transmission clock generator 100 is provided which is represented in FIG. 3 by a counter 102a for addressing a PROM 102b already discussed with reference to FIG. 2.

The transmission clock generator, clock pulse coupler, and all other parts of the transmitter are arranged in a housing 91 which is not grounded, mounted on a platform at the top of a high-voltage tower. The optical fibers lead of a receiver at the ground station.

Equivalent to the receiving-side shift registers 213, . . . , 253 of FIG. 2 triggered by the sampling control are the memories 114, . . . , 154 of FIG. 3, the data inputs of which are connected to light-sensitive receivers 113, . . . , 153. Such a receiver 103 is connected also to the optical fiber LT for the clock pulses.

Illustrated in a simplified manner, the generator 100 furnishes a high-frequency operating clock a1 for the memory 102b addressed by counter 102a, and also, by frequency division, a counter clock a2 of double the transmission frequency ($a2=2\times a3$). For the synchronous generation of the fixed clock message portion PT as well as of the data messages on L1 to L5 during the first eight transmission clock periods the PROM controls with the transmissions clock a3 the clock pulse coupler 101, 102 and strobes, with the counter reading a2 the data sources for enabling the loading of the data messages on the respective lines. Therefore, the analog/digital converters control the light sources bitwise in synchronism with the pulse edges of these constant clock pulses.

The clock pulses are received in the receiver, which in accordance with the counter 215 and the interval recognition means 217 of FIG. 2 is represented as a combined counter/time monitoring element 104, 104e connected to the clock line via the optoelectric receiver 103 and the limit indicator 119a.

Instead of the logic gate 216 from FIG. 2, a switch 105 is shown schematically in FIG. 3. It can be actuated by the element 104, which by counting the received constant clock pulses of the fixed clock message portion PT determines their end and separates the sample pulse picked off at the light source 103 from the trigger input of the memories 114, . . . , 154. The arrangement is laid out, therefore, during the fixed clock message portion PT for the synchronous transmission of the data messages and the respective clock pulses.

The freely usable clock pulse position ZT in the clock message it is intended to check the optical transmission system for the clock messages, as is known in principle from DE-OS No. 34 14 395. To this end, the PROM 102b sends in the half-period of the counter clock following the fixed clock message portion PT, an actuating signal to the driver 104a, which thus in accordance with the time element 204a of FIG. 2 controls a supplementary clock pulse. However, the transmitting power or amplitude of this supplementary clock pulse is selected smaller than the transmitting power of the constant clock pulses. The receiver samples the light intensity of the received clock pulses via the limit indicator.

Therefore, proper functioning of the optical clock pulse transmission can be inferred if at a gate 119c released by the time monitoring element 104 a message appears on the clock telegram position ZT. In case of aging or malfunction of the transmission system, first the supplementary pulses ZT in the pulse message will disappear, while proper relaying of the constant clock message portions (that is, of the clock pulses needed for synchronous sampling) is still ensured. At a corresponding monitoring signal, therefore, the transmission system need not be repaired immediately; instead, this can be done at the time of the next routine maintenance.

While it was assumed until now that the data messages extend only over the fixed clock message portion, other configurations are also possible.

From the received data the ground station forms, in a regulator 411 and a corresponding control unit 412—for the control of which via a line L6 the voltage zero crossings are made available—thyristor firing pulses, which fire the light-controlled thyristor switch 401 via a light source 413 and the optical fiber L8.

For the actuation of the power supply unit, controlled pulses are provided via a line L7 from the ground station to the transmitter. The lines L7 and L8, serving for transmission to the transmitter, do not interfere with the process of the high-frequency data transmission. Similarly the line L6, does not create interference signals because it does not carry a high-frequency signal. For the high-frequency data transmission between the transmitter and the receiver, therefore, only the data lines L1 and L5 are available the good utilization of which is the subject of the invention. The desired transmission frequency of 1 MHz (two data positions corresponding to each clock period) requires a synchronous transmission method, for which only the clock line LT with the respective clock pulse coupler is provided.

The use of optical fibers according to the invention now makes the high-frequency transmission frequency possible without leading to insulation problems between the transmitter installed in an ungrounded housing 409 and the receiver on the ground station. The mentioned advantageous control of the transmission system consisting of a light source, waveguide and optoelectronic receiver there is provided in each data telegram the position 15, for coupling in a data pulse with a transmitting power reduced as compared with the normal transmission power, the intensity of which is monitored by the receiver as a measure of the quality of the optical transmission system.

A further data position 16 serves for the transmission of additional monitoring signals for the transmitter. It is assumed that between transmitter and receiver of repeater ("intermediate station") is arranged for amplification of the optical pulses, these monitoring signals being combined there to a low-frequency alarm signal and transmitted to the receiver via a conventional line without any insulation problems. Position 16 can then be utilized—just like the pulse position ZC of the clock message—for a test pulse to check the optical transmission between repeater and receiver.

Figure 5:
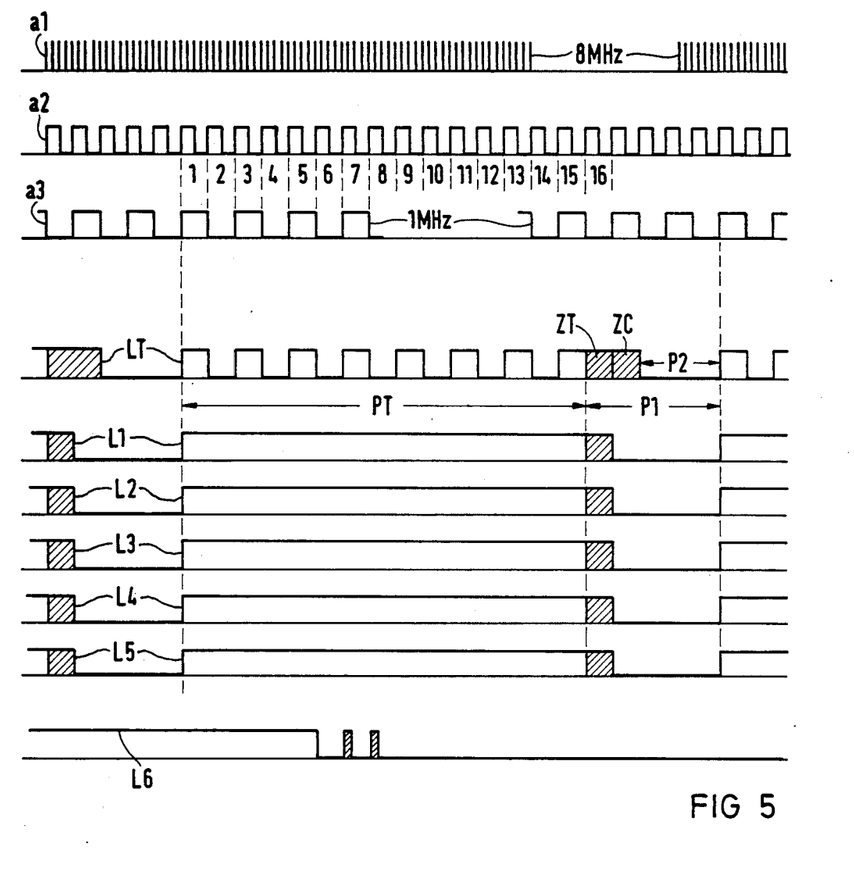

Two such test pulses are provided also in the zero crossing signal on line L6, so that there result the pulse diagrams of FIG. 5. During the time PT, data message and the fixed clock message portion are sent out and sampled synchronously, while the hatched supplementary pulses are sampled asynchronously.

Figure 6:
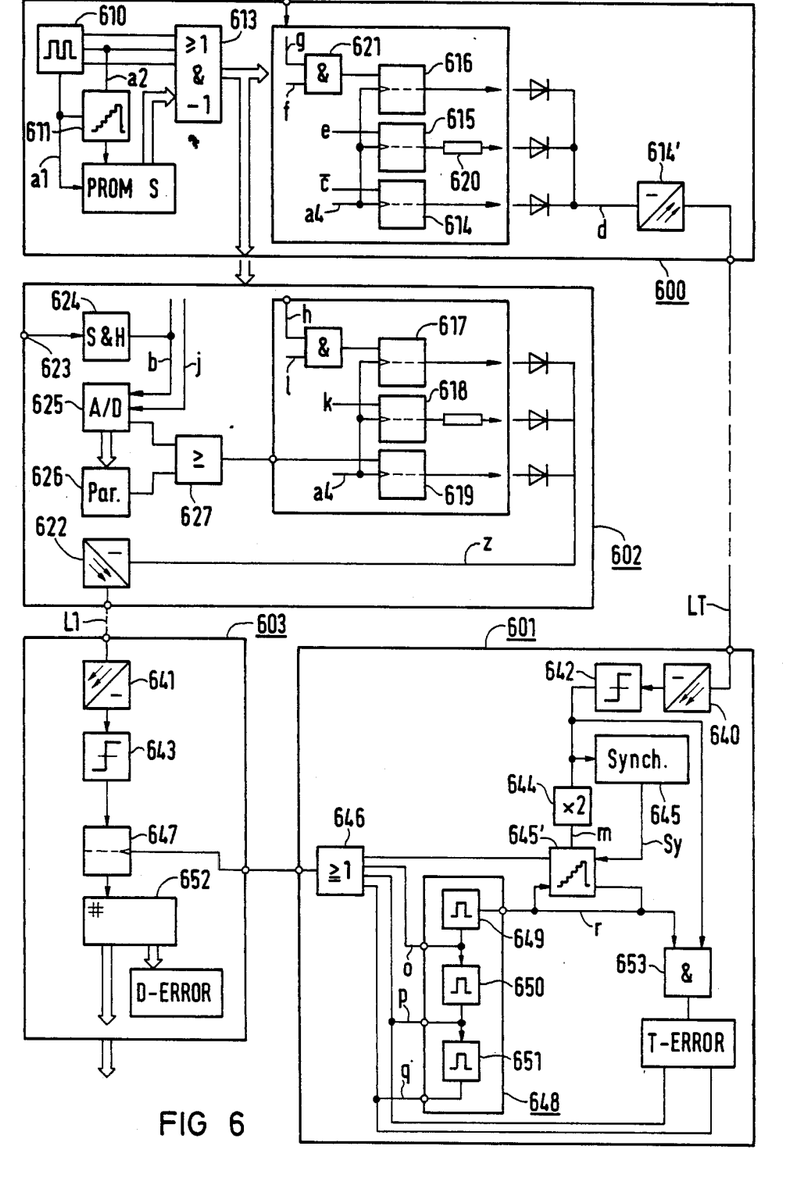
FIG. 6, shows circuit realization of the arrangement of FIG. 3 for a single data line.

A more detailed representation of the device is shown in FIG. 6, the modules 602 and 603, of which there are five for the transmitting and receiving of the data telegrams L1 to L5, and transmitting parts 600 and receiving parts 601 associated with the clock message LT are provided.

Figure 7:
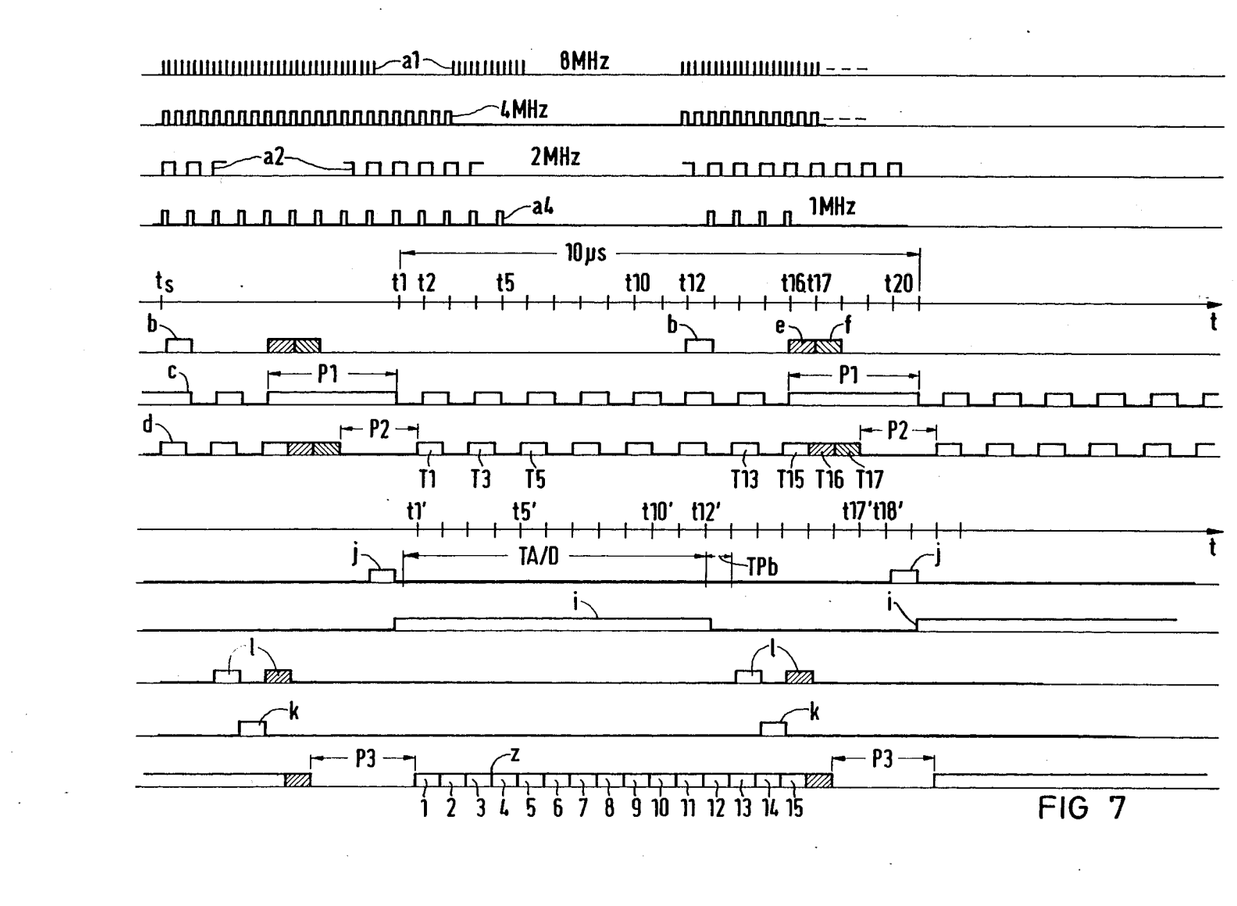
FIGS. 7 and 8, show the pulses from the transmitter or receiver occurring at the lines and at the program control.

The quartz oscillator 610 with a frequency divider circuit generates an 8-MHz frequency a1, a 4 MHz frequency equal shown in FIG. 7, and a 2-MHz frequency signal a2, and also, by logic operation, a 2-MHz sequence S4 of narrow pulses. The pulse width of these narrow pulses can be further reduced by linkage with the 8-MHz frequency which also is supplied as internal operating clock to a counter 611 and to a programmable memory "PROM S" for the transmission program. The program contained in the programmable memory furnishes, at the data output 612, signals which are linked with the signals of oscillator 610 via a logic circuit 613. The programming of the "PROM S" and the setup of the logic circuit will be explained with reference to the pulse of FIG. 7 so that their implementation will be understood by one skilled in the art.

Starting at time ts, the counter counts the pulses of the 2-MHs clock a2 at rising edge of the 4-MHz clock in each instance. Hence the counter is time-shifted relative to the 2-MHz clock a2. The time to is determined by resetting the counter content after twenty counter clock pulses (pulse b). The memory addressed with the counter reading generates the synchronization signals of the pulse edges of which coincide at the time t1 to t16 with the positive edges of the counter clock. But between t16 and t20 a signal interval P2 is maintained. A flip-flop 614 triggered with a4 generates from the signal C inverse to c the pulse sequence d from the clock pulses T1, T3, T5, . . . , T15, which as constant clock pulses form the fixed clock message portion PT of FIGS. 1 and 5 and control the light source 615.

These constant pulses, therefore, are cut off during the signal interval P2, but for the duration of tne clock message portion PT they have only a constant time shift relative to the counter clock pulse or a2, hence are "synchronous."

At times t16 and t17, when the synchronization signal c is already in the interval state, signals e and f are generated by PROM S for the duration of one counter clock. With the signal e, a first supplementary clock pulse T16 is sent via the D flip-flop 615 to the light source,615, which may be, for example, a luminescent diode, the devices for control of the diode current not being shown in FIG. 6. By 620, components are symbolized with which the diode current and hence the transmitting power of the respective light pulses are reduced relative to the intensity of that of the light pulses strobed by the other D flip-flops. The D flip-flops 615 and 618 thus generate a test pulse with which the quality of the optical transmission system is monitored.

At line g an additional monitoring signal is present, by which a lock 621 is released by pulse f. Thereby the D flip-flop 616 generates a further supplementary clock pulse to be coupled into the free clock message portion. In the pulse diagram d of the light pulses omitted by the light source, the batched supplementary pulses T16, T17 of the free clock message portion can be seen in addition to the constant clock pulses T1, T3, T5, . . . , T15 of the fixed clock message portion.

By z in FIG. 7 is represented further the diagram of the data message coupled into the data line L1 by the light source 622. These contain the data locations 1 to 15 synchronous with the fixed clock message portion as well as a supplementary data pulse shown batched, the positions 1 to 12 being reserved for the bits of a byte present at a measured value input 623, and position 13 to the parity bit of this byte, while on location 14 the state of a monitoring signal h, and on position 16, a further monitoring bit (for the generation of which no further details need be represented here) are to be relayed. Location 15 serves for the transmission in of a test pulse of reduced transmitting power for monitoring the optical transmission system as previously discussed.

To generate this data message, still during the clock message interval there is set with the terminal edge of the last counter clock pulse j (time t1) an enable signal i which at time t13 is reset with the terminal edge of pulse b. The value present at the measured value input 623 during pulse j is stored for the duration of pulse i in the sample and hold amplifier 624 and is available at the input of an analog/digital converter 625 whose operating clock is likewise released by the enable signal i. By TA/D is indicated the read-out cycle at the serial converter output connected via an OR gate 627 to the input of flip-flop 619, the respective bit being present at the output of this gate at the rising edges of clock a2, that is, at times t1', . . . , t12' and being connected via the trigger signal a4 to the control input of light source 623. As all light sources of the transmitter are controlled by flip-flops which are triggered by the same signal a4, the synchronous coupling in of the clock pulses and data pulses in the transmitter is ensured.

Connected to the parallel output of converter 625, is further a parity generator 626 which during clock TPb, following the serial read-out, adds a corresponding parity bit into flip-flop 619 via OR gate 627.

At the times t14 and t16, the remaining data message positions can be occupied with test and monitoring bits via the counter clock pulses k and l and the PROM S in the manner already discussed.

Figure 8:
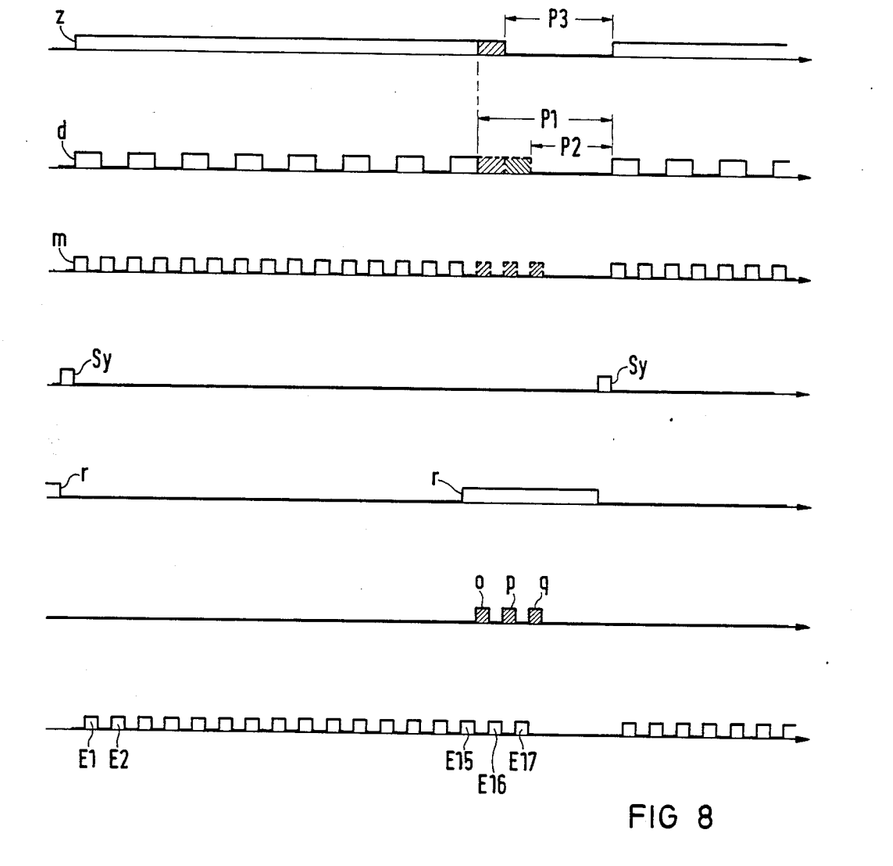

On the receiver side of the data line LT, a detector (light- sensitive element 640, limit indicator 642) with a timing stage 644 is arranged, which generates in each instance at an edge of d a pulse of 0.5 microseconds (pulses m, FIG. 8). This, therefore, involves a frequency doubling, there being present in accordance with the usage of the free clock message part (at least one of the pulses shown hatched). An interval recognition means 645 connected to the clock pulse detector generates a sample-synchronization pulse Sy as soon as a message interval of at least 1.25 microseconds (equivalent to P2—1.5 microseconds) occurs on the clock line. By this signal the input of a counter 645' for the pulses m is enabled, which after the number of 15 counter clock pulses present for the fixed clock message portion generates an overflow signal r, which blocks the counter input again. The counter reading itself is set to zero with the first counting pulse.

The counter clock at the input of counter 645 therefore contains only the pulse sequences of the previous counter pulses. After passing through on OR gate 646, these serve to trigger with their descending edges a D flip-flop 647 for the signals formed by the data pulse detector 641, 643. Thereby the data message z is sampled synchronously for the duration of the fixed clock message portion, and at the flip-flop 647 there result at first the sampled pulses E1 to E15. Further synchronous sampling of the data messages is prevented via the counter barrier r. But with the overflow signal r there are triggered in a time control 648 time stages 649, 650 and 651 which deliver the output pulses o, p and q with a given delay and pulse duration. Thereby the pulses n, which are triggered by the pulses d of the fixed clock message portion are continued in the 2-MHz clock time-controlled. By coupling-in via the OR gate 646 it is brought about that now also the supplementary data position 16 is sampled with a corresponding sample pulse E16 (and moreover still following pulses falling into the data message interval P3 when transmission faults occur).

The serial data message is converted into a parallel data word by means of a (flip-flop) circuit 647. The 12-bit word and the parity bit are read into temporary memory, the rest of the bits being supplied to an error evaluation circuit "D-ERROR". Thus the parity bit on position 13 can be used to indicate an error in the data transmission when a parity error occurs (or upon the occurrence of a bit on the location E17 not permitted for the data message). Then evaluation of the transmitted measured value must be suppressed or, in case of an accumulation of such faults, the entire system must be stopped. A missing pulse for the test bit on position 15 indicates a degration of the optical transmission properties, at which a malfunction of the system is not yet imminent; a lower priority may therefore be assigned to the respective fault message. Similarly also the remaining supplementary data pulses assigned to certain monitoring equipments can be evaluated and be further processed in the error indication to respective collective alarms.

The pulses o, p and q of the time control 648 are available not only for the described synchronous evaluation of the free clock message portions. To this end, the outputs of the clock message detector 640, 642 are released at an AND gate by means of the overflow signal r and supplied to a clock error display "T-ERROR". In this manner the free clock message portion can be sampled by the sampling pulses E16 and E17 and from the supplementary clock pulses a corresponding error indication can be derived.

According to the invention, therefore, the clock line is occupied with a clock message sequence which, in accordance with an asynchronous method, contains minimum intervals as well as fixed clock message portions programmed for the recognition of message start and end, and also freely usable clock message portion. Due to this feature, the clock line can also be utilized for information transmission.

For a data line, the invention provides switching between sampling synchronized to the fixed clock message portion and asynchronous scanning during the free clock message portions and the clock intervals, so that the data line is available for data transmission practically without interruption. Thus all data lines that are available for rapid, high-frequency data transmission are optimally utilized. Also optical fibers can be employed and monitored in a simple manner.

What is claimed is:

1. A method of data transmission between two stations, comprising: relaying via a clock line clock messages, said clock messages being separated from each other by message intervals and containing fixed clock message portions at their beginning and free clock message portions, said fixed clock message portions consisting of a fixed sequence of alternating clock pulses and said free clock message portions consisting of clock message data positions, and via a data line, data messasges beginning synchronously with the clock messages and each data message being sampled during the fixed clock message portion synchronously with the clock pulses (LT) of the clock message and being sampled during free clock message portions and clock message intervals by means of a time control.

2. The method according to claim 1, wherein a transmitter determines data positions of the data messages by a half-period of the transmission clock in each instance.

3. A method for data transmission between a transmitter station and a remote receiving station for processing of the transmitted data, by using a clock line for transmitting a clock message and a plurality of data lines for simultaneously transmitting data messages over separate data lines basically parallel to said clock line, wherein:

(a) in each transmission cycle a transmitter
(a1) generates after a message interval a sequence of alternating clock pulses for generating said clock message,
(a2) addresses at each of predetermined pulse edges of said clock pulses a next data position of each data message,
(a3) generates data pulses corresponding to the data to be transmitted for formation of said data messages,
(a4) couples at least the sequence of alternating clock pulses as fixed clock messages and each of the data messages into said clock line and said data lines, respectively, and
(a5) with each message interval resets the data positions of said data messages and blocks the coupling-in of pulses into the clock line; and
(b) a receiver
(b1) recognizes, on the clock line, from the message interval end, the beginning of the data messages, and
(b2) after the message interval samples the pulse occupation on the data lines synchronously with the clock pulses received on the clock line.

4. The method according to claim 3, wherein the transmitter determines the data positions of the data messages by a half-period of the transmission clock.

5. The method according to claim 3, wherein after the end of the fixed clock message portion following a message interval, the transmitter uses the clock messages or/and the data messages for supplementary pulses corresponding to data to be transmitted, and after the end of each fixed clock message portion the receiver switches to time-controlled sampling of the supplemetary pulses.

6. The method according to claim 5, wherein by counting the constant clock pulses of the fixed clock message portion the receiver establishes the end thereof and triggers a time control which forms gating pulses for sampling of the supplementary pulses.

7. The method according to claim 3, wherein data pulses are transmitted via an optical transmission system consisting of a controllable light source in the transmitter, an optical fiber data line and a light-sensitive electric component, and, independently of the data to be transmitted, for monitoring the optical transmission system a light pulse of reduced transmitting power is transmitted in a predetermined data position of a data message, and the output signals of the component associated with this predetermined data position is monitored.

8. The method according to claim 5, characterized in that the clock pulses are transmitted via an optical transmission system consisting of a controllable light source in the transmitter, an optical fiber as clock line, and lightsensitive electric component, and that on a predetermined position of the clock message lying outside the fixed clock message portion a light pulse of reduced transmitting power is transmitted and the output signal of the component associated with the predetermined position is monitored.

9. A device fro data transmission between a transmitting station and a receiving station remote therefrom for further processing the data, comprising:

(a) in the transmitting station:
(a1) a transmission clock generator generating a sequence of clock pulses alternating at a transmission frequency and a clock pulse coupler coupling clock pulses from said clock generator into a clock line;
(a2) a data source, which is controlled by a sequence of enable signals and couples data pulses to be transmitted into a data line; and
(a3) a pulse control means connected to said clock generator, clock pulse coupler and data source, which during a signal interval of given minimum length blocks the coupling of clock pulses into said clock line, after the signal interval enables the clock pulse coupler to release a given number of constant clock pulses and generates said enable signals synchronously with said constant clock pulses, wherein the sequence of enable signals is resettable at the end of a signal interval; and
(b) in the receiving station a receiver containing
(b1) an interval recognition means connected to said clock line,
(b2) a sampling means connected to said data line and being activated by a sequence of sampling pulses, for sensing the transmitted data, and
(b3) a sampling control connected to said interval recognition means and said sampling means for formation of said sequence of sampling pulses, wherein said sampling control is triggered by the received clock pulses, blocks the sampling pulses triggered by the clock pulses during a signal interval and resets the sequence of said sampling pulses when a pulse interval exceeding a given minimum synchronization interval occurs on the clock line.

10. The device according to claim 9 wherein the clock pulse coupler contains a coupling-in circuit by which, toward the end of a transmission cycle defined by a predetermined number of transmission clock periods, in the intervals between certain constant clock pulses, supplementary clock pulses can be coupled to the clock line; for a synchronization interval of given minimum length being maintained between a supplementary pulse and the beginning of a new transmission cycle; wherein the pulse control means is resettable only at the end of a transmission cycle; where the sampling control contains a counting means, which between the certain constant clock pulses blocks the trigger input of the sampling control, and a time control (104) which furnishes time-controlled sampling pulses; wherein to the clock line a clock pulse detector is connected, which is sampled with controlled probing pulses; and wherein the interval recognition means resets the sampling control whenever a pulse interval exceeding the minimum synchronization interval appears on the clock line.

11. The device according to claim 10, wherein the clock pulses are light pulses, the clock line is an optical fiber; the supplementary clock pulse is a light pulse of reduced transmitting power; and wherein at the clock pulse detector the received power of the supplementary clock pulse is sampled as a measure of the quality of an optical element.

12. The device according to claim 9, wherein the transmitting station is arranged in an ungrounded housing; wherein the data source contains a measuring element arranged at a highvoltage network and having an output for serial data output and a first controllable light source connected thereto, and means for the coupling of supplementary pulses onto the control input of the light source; wherein the pulse control contains a programmable memory for controlling the first light source and gated by the transmission clock generator; wherein the clock line and the data line are optical fibers to which photoelectric detectors are connected in the receiver.

* * * * *